United States Patent
Lapushin et al.

(10) Patent No.: US 6,310,645 B1
(45) Date of Patent: Oct. 30, 2001

(54) METHOD AND APPARATUS FOR MEASURING CHARACTERISTICS OF A COMMUNICATION SIGNAL MODULATED WITH A COMPOSITE VIDEO SIGNAL WITHOUT SYNCHRONIZING TO THE SIGNAL

(75) Inventors: Semyon Lapushin, Tucker; Boris Smychkovich, Alpharetta; Alexander Birger, Duluth, all of GA (US)

(73) Assignee: Antec Corporation, Duluth, GA (US)

( * ) Notice: Subject to any disclaimer, the term of this patent is extended or adjusted under 35 U.S.C. 154(b) by 0 days.

(21) Appl. No.: 09/189,585

(22) Filed: Nov. 10, 1998

Related U.S. Application Data
(60) Provisional application No. 60/086,844, filed on May 27, 1998.

(51) Int. Cl.[7] .................................................. H04N 17/00
(52) U.S. Cl. ........................ 348/192; 348/192; 348/191; 348/181; 348/6
(58) Field of Search .................................. 348/192, 191, 348/193, 181, 6; 324/76.24, 76.38; 455/226.2, 3.1

(56) References Cited

U.S. PATENT DOCUMENTS

| | | | | |
|---|---|---|---|---|
| 5,214,500 | * | 5/1993 | Takayama et al. | 358/10 |
| 5,473,361 | * | 12/1995 | Penney | 348/6 |
| 5,585,842 | * | 12/1996 | Chappell et al. | 348/192 |
| 5,617,137 | * | 4/1997 | Whitlow | 348/193 |
| 5,649,304 | * | 7/1997 | Cabot | 455/67.4 |
| 5,740,064 | * | 4/1998 | Witte et al. | 364/487 |
| 5,749,047 | * | 5/1998 | Cabot | 455/67.4 |
| 5,862,451 | * | 1/1999 | Grau et al. | 455/5.1 |
| 5,867,206 | * | 2/1999 | Voght et al. | 348/6 |
| 5,966,186 | * | 10/1999 | Shigihara et al. | 348/570 |

* cited by examiner

*Primary Examiner*—John K. Peng
*Assistant Examiner*—Paulos Natnael
(74) *Attorney, Agent, or Firm*—Troutman Sanders LLP; Gerald R. Boss; Roger S. Williams

(57) ABSTRACT

A method and apparatus for measuring a characteristic of a communication signal modulated with a composite video signal without the need for a synchronizing device. Samples are taken of an intermediate signal derived from the received communication signal that represents the power spectrum of the communication signal at different instants of time. From a priori knowledge of the spectral characteristics of the communication signal modulated with a composite video signal, predetermined features of the communication signal are identified based on the relative values of the samples collected over a period of time equal to an entire frame of the composite video signal. The sample with the maximum value of a plurality of sample values collected for one frame is coincident with the occurrence of a vertical synchronization pulse of the composite video signal, which occurs when no modulation is present, and therefore is representative of the power of the communication signal at the visual carrier frequency. Once the sample with the maximum value sample is identified, the beginning of a frame is known, and therefore the power level of any other portion of the composite video signal can be measured based on the power level of the communication signal at a particular point in time with respect to the point in time that the maximum value sample occurred.

9 Claims, 4 Drawing Sheets

METHOD AND APPARATUS FOR MEASURING CHARACTERISTICS OF A COMMUNICATION SIGNAL MODULATED WITH A COMPOSITE VIDEO SIGNAL WITHOUT SYNCHRONIZING TO THE SIGNAL

This application claims priority to U.S. Provisional Application No. 60/086,844, filed May 27, 1998, entitled "Method Of Carrier And Distortion Measurement In The Presence Of Video Signal."

BACKGROUND OF THE INVENTION

The present invention is directed to measuring the quality of communication signals, and more specifically to a method and apparatus for measuring characteristics of a communication signal modulated by a video signal, such as a composite video signal, which is transmitted from one location to another, such as by a cable television (CATV) system.

Existing methods for measuring the quality of a communication signal modulated with a composite video signal in CATV systems require the use of a device connected to the channel that synchronizes to the composite video signal to identify a vertical blanking interval (VBI) where no visual carrier modulation occurs. Such a device is quite costly and cumbersome.

It is desirable to measure the quality of a signal, such as communication signal modulated with a composite video signal in a CATV system, in the presence of modulation, without the need for a synchronizing device.

SUMMARY OF THE INVENTION

According to the present invention, a method and apparatus are provided for measuring a characteristic of a communication signal modulated with a composite video signal by examining samples of an intermediate signal derived from the received communication signal that represents the power spectrum of the communication signal at different instants of time. From a priori knowledge of the spectral characteristics of the communication signal modulated with a composite video signal, predetermined features of the communication signal are identified based on the relative values of the samples collected over a period of time equal to an entire frame of the composite video signal. For example, the sample with the maximum sample value of a plurality of samples collected for one frame is coincident with the occurrence of a vertical synchronization pulse of the composite video signal, when no modulation is present. Therefore, the maximum sample is representative of the power of the communication signal at the visual carrier frequency. Moreover, once the sample with the maximum level is identified, the beginning of a frame is known, and therefore the power level of any other portion of the composite video signal can be measured based on the power level of the communication signal at a corresponding point in time.

In one embodiment, the samples of the intermediate signal are processed in digital form, and therefore, the present invention is well suited for implementation by digital signal processing techniques using any suitable processing device. Consequently, effective "synchronization" to the communication signal is achieved without the use of a costly synchronizing device.

The above and other objects of the present invention will become more readily apparent when reference is made to the following description, taken in conjunction with the accompanying drawings.

DETAILED DESCRIPTION OF THE INVENTION

Figure 1:
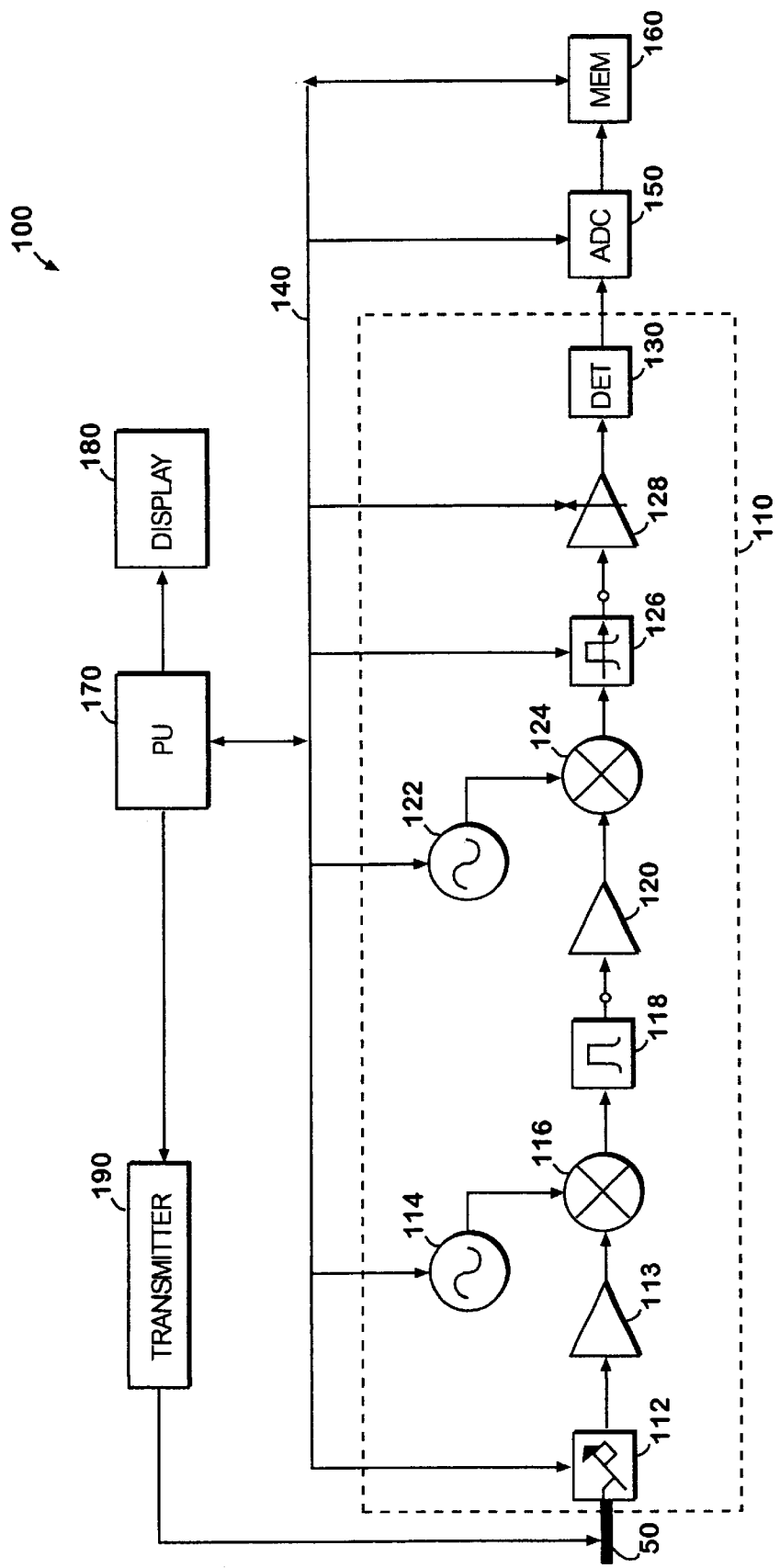
FIG. 1 is a block diagram of the measuring apparatus according to the present invention.

Referring first to FIG. 1, the measuring apparatus according to the present invention is shown generally at 100. The measuring apparatus 100 comprises a receiver 110, an analog-to-digital converter (ADC) 150, a memory 160 and a processor unit (PU) 170. The PU 170 is coupled to the receiver 110, ADC 150 and memory 160 by a data and control bus 140. The receiver 110 is designed to receive signals from a communication channel present on a CATV cable 50. Optionally, the measuring apparatus may comprise a display 180 for displaying measurements and a transmitter 190 coupled to the CATV cable 50 for transmitting measurement information to a remote location, such as a CATV head-end unit.

The receiver 110 comprises known high sensitivity receiver circuitry for receiving and demodulating a communication signal modulated by a composite video signal, such as a CATV signal, to recover the composite video signal therefrom. However, the receiver 110 is tunable and adjustable for purposes explained hereinafter. The received communication signal from the cable 50 is coupled to a variable attenuator 112 and a radio frequency (RF) amplifier 112. The output of the RF amplifier 112 is connected to a mixer 116 that is driven by a local oscillator 114. The output of the mixer 116 is connected to a bandpass filter 118 that filters the mixed signal and outputs a first intermediate frequency (IF) signal that is coupled to an amplifier 120. The output of the amplifier 120 is coupled to a mixer 124 that is driven by a local oscillator 122. The PU 170 controls the local oscillators 114 and 122.

The output of the mixer 124 is coupled to a controllable bandpass filter 126, the output of which contains a second IF signal that is coupled to an adjustable-gain amplifier 128. The output of the adjustable gain amplifier 128 is connected to a detector 130 which outputs a signal whose direct current (DC) level represents the power spectrum of the communication signal at different instants of time. The output of the detector 130 is hereinafter called an intermediate signal. The PU 170 controls the band pass filter 126 and adjustable-gain amplifier 128.

The ADC 150 is coupled to the output of the detector 130 and samples the intermediate signal at a sample rate, and in so doing, converts each sample to a digital word representative thereof. The PU 170 controls the sample rate of the ADC 150. The output of the ADC 150 consists of a sequence of digital words representing consecutive samples of the intermediate signal, which in turn represents the power spectrum of the communication signal at different instants of time. These digital words are stored in the memory 160 as they are generated. The PU 170 accesses the memory 160 to perform the measurement processes explained hereinafter.

The PU 170 may be any type of relatively high speed processing device, such as a microprocessor or digital signal processor ASP). In the case of a microprocessor, a software control program is stored in the memory 160 (or a separate memory, such as a read only memory) for implementing the control and signal processing functions described hereinafter. In the case of a DSP, the control program is created on a standard personal computer with suitable software, and is installed as firmware into a read only memory of the DSP. It is also possible that the PU 170 can be implemented in the form of an application specific integrated circuit (ASIC).

Figure 2:
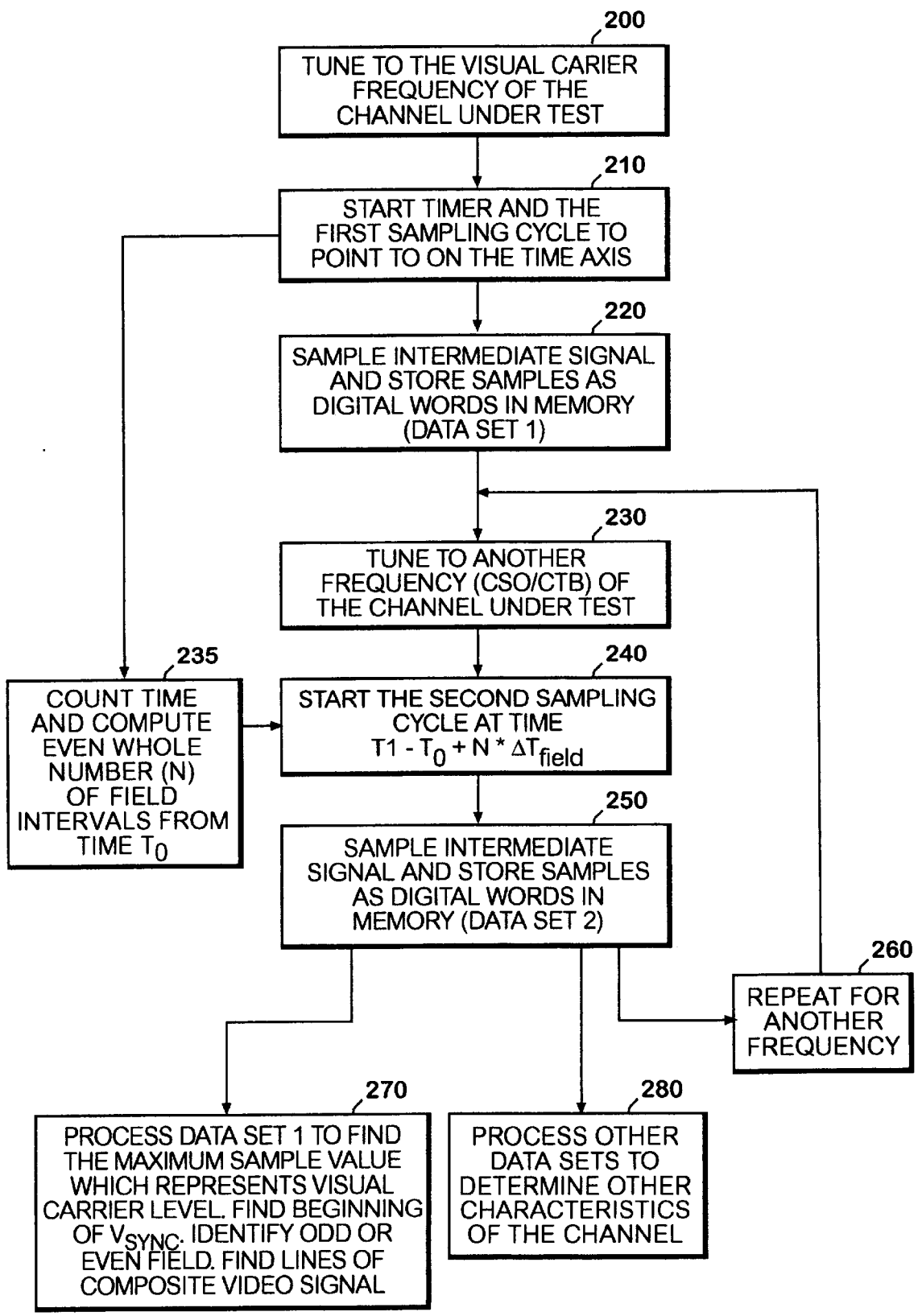
FIG. 2 is a flow chart illustrating the measuring method according to the present invention.

Turning to FIG. 2, in conjunction with FIG. 1, the measuring process is explained in more detail. In step 200, the PU 170 tunes the receiver 110 to the visual carrier frequency of the channel under test. Specifically, the local oscillator 114 is set to a frequency to provide conversion of the communication signal received from the cable 50 at the visual carrier frequency for the channel under test. Next, in step 210, a timer is started to coincide with the start of the first sampling cycle. This starting point is referred to as time To.

In step 220, the intermediate signal at the output of detector 130 is sampled by the ADC 150 at a sample rate (under control of the PU 170). The samples are converted to digital words by the ADC 150 and stored in the memory 160. The first sampling cycle is at least as long as one frame (two fields) of the composite video signal. One field time is approximately 16.67 msec for a standard NTSC composite video signal. The sample rate is adjustable and is controlled by the PU 170 according to a desired sample resolution, and is preferably set to a rate sufficient for reconstruction of the vertical and horizontal synchronization pulses and the vertical interval test signal (VITS). For example, a sample is taken every 10 $\mu$sec. The samples taken during the first sampling cycle are referred to as a first plurality of samples, or DATA SET 1.

In step 230, the receiver 110 is tuned to any other specified frequency of interest to measure a characteristic of the channel under test at that specified frequency. For example, the receiver may be tuned to each of the composite second order (CSO) distortion frequencies to obtain a data set (a plurality of samples) at each CSO frequency with respect to the visual carrier frequency. In step 240, the sampling cycle is started at a time instant $T_1 = T_0 + N^* \Delta T_{field}$, where N is an even whole number, $\Delta T_{field}$ is the time interval for one field, and $T_0$ is the time instant when the first sampling cycle started (DATA SET 1). This ensures that the next data set is offset from the first data set by at least one frame. The time period for initiating the next sampling cycle is computed in step 235, counting from the time that the first sampling cycle is taken.

In step 250, sampling of the intermediate signal is begun at time $T_1$ for a period of time equal to one frame of the composite video signal. The data set generated from this sampling cycle is stored and the receiver can be tuned to another frequency and the process repeated as indicated at step 260. For example, if it is desired to measure the CSO distortion with respect to the visual carrier frequency, it is necessary to obtain a data set at each of four frequencies a predetermined distance from the visual carrier frequency Fc. That is, the receiver 110 is tuned to F1=Fc+1.25 MHz;F2=Fc−1.25 MHz;F3=Fc+0.75 MHz and F4=Fc−0.75 MHz. Data sets are generated at each frequency following the procedures of steps 230, 240 and 250, to generate DATA SET 2, DATA SET 3, DATA SET 4, and DATA SET 5, using CSO as an example.

Once the data set for the visual carrier frequency is processed (DATA SET 1), data sets at any other frequency can be analyzed. Specifically, the first plurality of samples is examined to identify the sample with the maximum value. The maximum value sample represents a power level of the communication signal at the visual carrier frequency in the channel under test. The level of the visual carrier frequency can be determined from the maximum value sample because the maximum value sample occurs at the vertical synchronization pulse (Vsync), which is when there is no modulation of the communication signal. Thus, once the maximum value sample is identified in the first plurality of samples, the level of the visual carrier frequency in the channel is determined through some calibration techniques. Calibration is performed by applying the composite video signal of known power levels to the input resulting in system output responses in a range corresponding to typically possible measurement conditions. Linear approximation can then be used for responses falling between the calibrated measurements. By identifying the maximum sample value, the precise location of the beginning of Vsync is identified (through the comparison of adjacent samples corresponding to Vsync).

In addition, in step 270, the first plurality of samples are examined to determine whether and which portion of DATA SET 1 is an even or odd field. By sampling the intermediate signal for a period of time known to exceed one frame time, it is ensured that sufficient information will be obtained for an entire frame. Which subset of samples represents an even or odd field is determined by examining the samples.

There are many ways to distinguish an even field from an odd field based on the known characteristics of a composite video signal. For example, in an odd field, an arbitrary sample that is offset from the beginning of Vsync by a time interval equal to 6 * H (where H is the horizontal line time interval 63.5 $\mu$sec.) occurs at the horizontal sync pulse (Hsync) which starts line 10. On the other hand, in an even field, the same arbitrary sample falls in the middle of line 9. Consequently, the level at the arbitrary sample (measured from the Vsync which is identified as explained above), is greater for an odd field than for an even field. Therefore, an even field is distinguished from an odd field by comparing the level of two occurrences of the arbitrary sample (obtained with respect to two occurrences of Vsync in a data set) from the plurality of samples.

In addition, once the beginning of Vsync is identified, the exact location of the beginning of the vertical blanking interval (VBI), or line 1, can be determined. It is known that Vsync actually occurs at the beginning of line 4 (in an odd field) or in the middle of line 3 (in an even field). Therefore, once Vsync is known, the beginning of VBI can be precisely determined by moving back a period of time corresponding to three lines. Each line is approximately 63.5 $\mu$sec. Furthermore, the locations of lines 10 through 19 carrying the vertical interval test signal (VITS) can be identified for various measurements. Indeed, any line of the composite video signal can be identified and measured once Vsync is precisely identified.

In sum, DATA SET 1, obtained when the receiver 110 is tuned to the visual carrier frequency of the channel under test, is analyzed to determine when a frame of the video signal begins, and when it ends, based on the relative magnitudes of the sample values and known characteristics of the composite video signal. Furthermore, once the sample corresponding to Vsync is identified from DATA SET 1, any other portion of the composite video signal can be identified to measure a characteristic at a corresponding instant of time of the communication signal. That is, the power level of the communication signal can be measured at any instant of time corresponding to a particular "line" in, or other feature of, the composite video signal.

In step 280, the other data sets are processed to determine other characteristics of the channel. In the CSO distortion example, the DATA SETS 2–5 are processed (one at a time) in a similar manner to DATA SET 1, to obtain the power level at each of the CSO frequencies F1–F4 by identifying the sample or group of samples in each data set which represents the power level without modulation at that frequency. The CSO distortion calculation is then made based on the power level at the visual carrier frequency and the power level (without modulation) at each of the CSO frequencies F1–F4. The CSO distortion example is explained below in greater detail in conjunction with FIG. 4.

Figure 3:
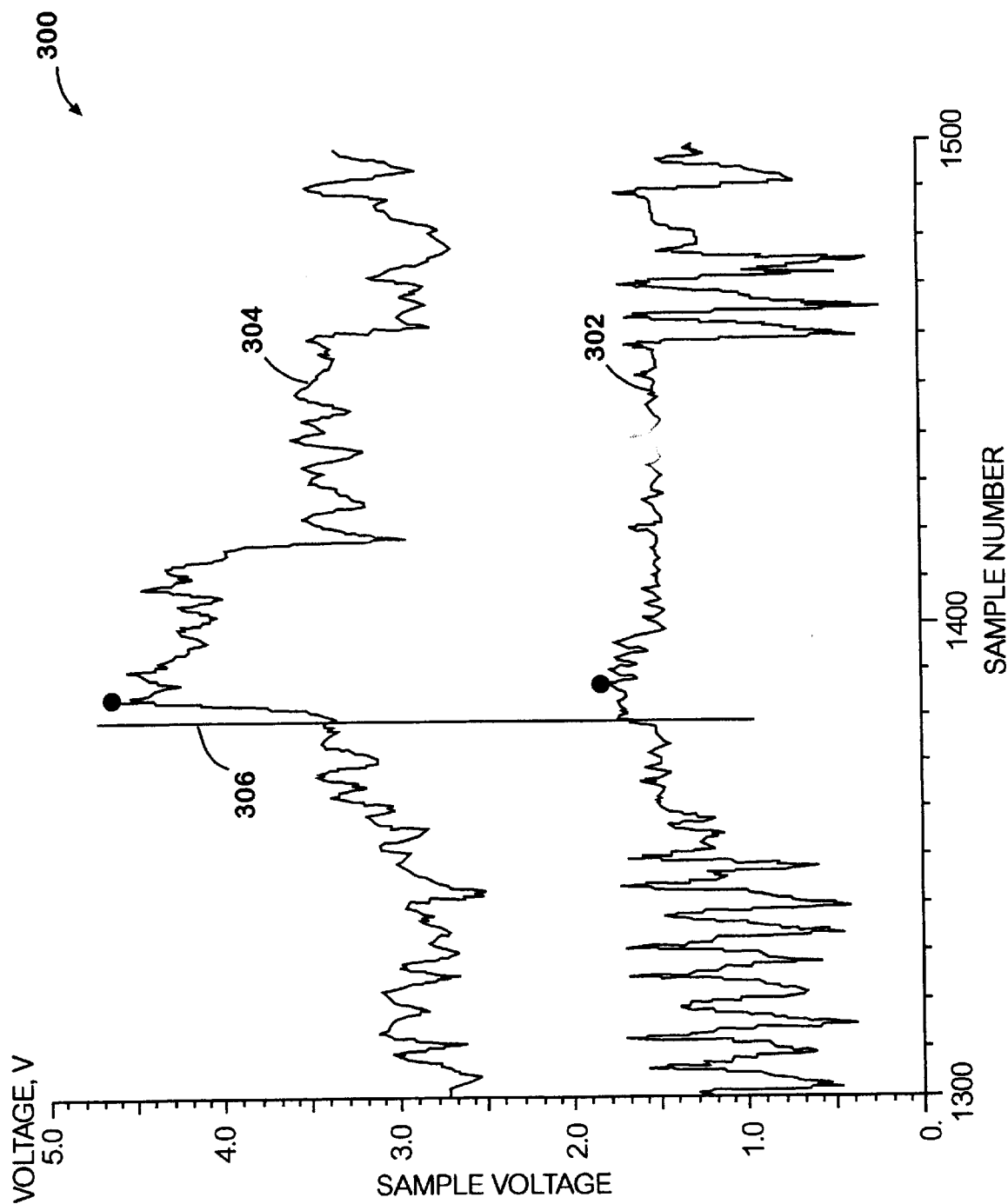
FIGS. 3 and 4 are diagrams illustrating the display of data obtained by the measuring apparatus according to the present invention.
Figure 4:
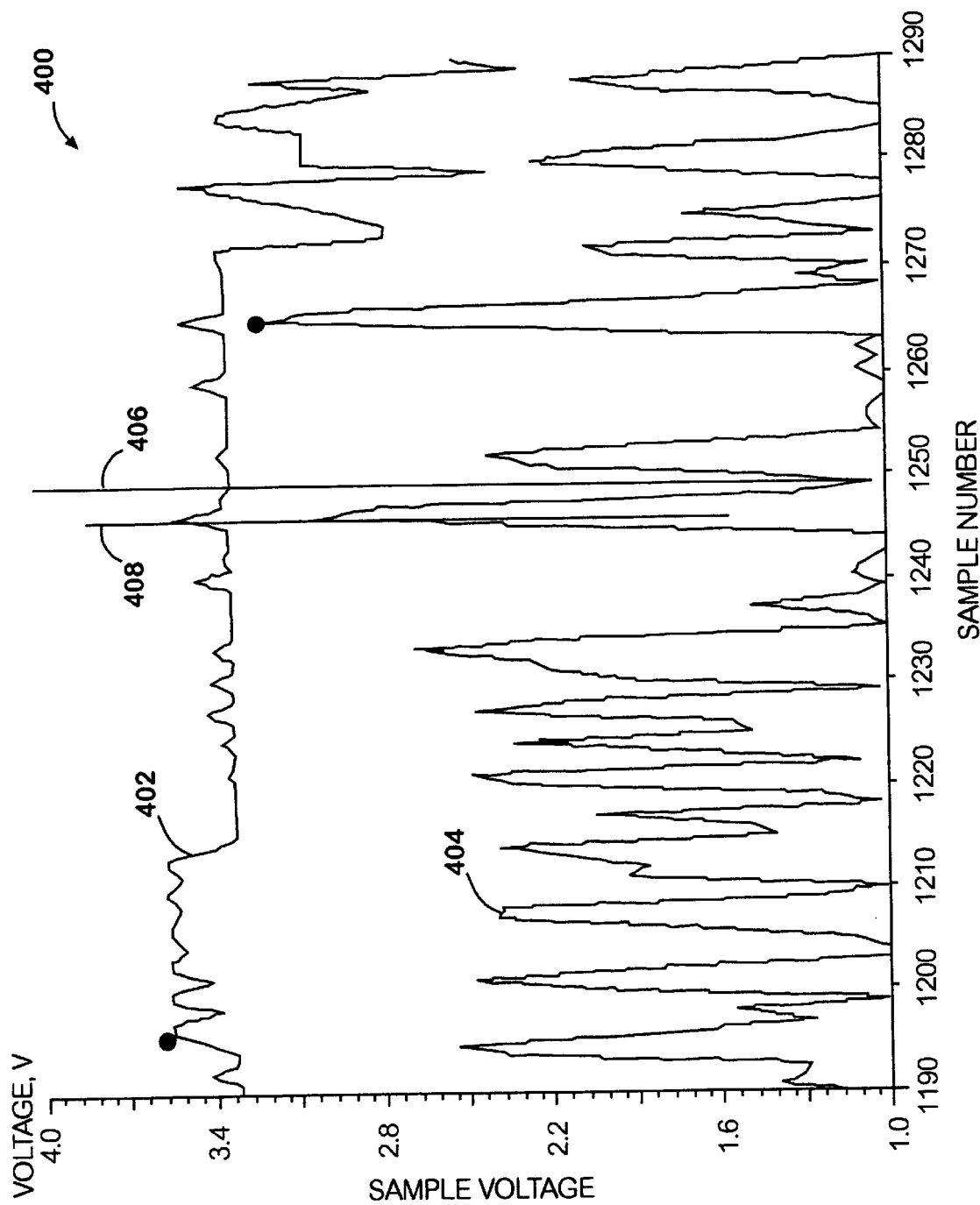

FIGS. 3 and 4 are examples of the type and format of information that are provided as output by the measuring apparatus 100. In FIG. 3, a display screen 300 is shown containing the plots of samples for a portion of two data sets 302 and 304 are shown. The lower data set 302 corresponds to a data set taken at the visual carrier frequency of the channel under test. The upper data set 304 corresponds to a data set also taken at the visual carrier frequency of the channel under test, but with different gain and bandwidth parameters for the receiver so as to simulate the composite third beat (CTB) frequency of the channel. These two data sets were taken in two non-consecutive frames. The starting point of upper data set 304 was synchronized with the starting point of the lower data set 302 by skipping an even amount of fields. The CTB signal, according to FCC requirements, is measured on the visual carrier frequency (in the absence of the visual carrier on a given channel) in a narrower bandwidth, typically 300 kHz, and with higher system gain because of its small power level relative to the visual carrier level.

A cursor 306 is shown in FIG. 3. User interface software that is executed by the PU 170 may be provided to move the cursor 306 across the data sets to identify which line and field of the samples the cursor position is aligned with. In addition, the sample number corresponding to the position of the cursor is displayed. This information is shown in the upper right hand corner of the display screen 300. Specifically, FIG. 3 shows the maximum value sample for the data set 302 is 1.72 volts which occurs at sample number 1387. Thus, sample number 1387 corresponds to Vsync.

FIG. 4 shows a display screen 400 containing data for data sets 402 and 404. Data set 402 is a data set obtained when the measuring apparatus 100 was tuned to the visual carrier frequency of the channel under test. Data set 404 is a data set obtained when the measuring apparatus was tuned to a CSO frequency with respect to the visual carrier frequency. Cursor 406 is aligned at an instant of time corresponding to the middle of line 12 of the composite video signal, also known as the "quiet line." Cursor 408 is aligned at an instant of time corresponding to the beginning of line 12. Measurements are taken at the instant of time corresponding to line 12 to make CSO distortion measurements. According to CATV industry standards, during line 12 in both fields, video modulation is turned off, so that the only signal present during this time is a signal representing the level of the CSO distortion, or the CSO signal. The group of samples corresponding to line 12 are averaged in order to derive the power level of the communication signal without modulation. This is done at each of the CSO frequencies in order to determine the power level without modulation for each CSO frequency.

In summary, the present invention is directed to a method for measuring a characteristic of a communication signal modulated with a composite video signal, comprising steps of: (a) tuning to a frequency associated with the communication signal; (b) receiving the communication signal and generating an intermediate signal comprising direct current (DC) levels representative of the power spectrum of the communication signal at different instants of time; (c) sampling the intermediate signal at a sample rate for a period of time that exceeds one frame of the composite video signal to obtain a data set comprising a plurality of samples of the intermediate signal; (d) examining the plurality of samples to identify a predetermined feature of the communication signal; and (e) measuring a characteristic of the predetermined feature of the communication signal. The particular frequency to which the receiver is tuned determines how measurements are made. If the particular frequency is the visual carrier frequency, then the maximum sample of the plurality of samples is identified, and the power level at the visual carrier frequency is determined therefrom. If it is desired to measure a characteristic at a particular portion of the composite video signal, the maximum value sample is first identified to synchronize to the beginning of a frame. Once the beginning of the frame is identified, the power level at any portion of the composite video signal can be determined based on the level of the communication signal at a particular sample corresponding in time to that portion of the composite video signal. Moreover, if several samples span a particular portion of the composite video signal of interest, then the average value of those samples can be computed to obtain the measurement.

The apparatus according to the present invention comprises a receiver that receives the communication signal and generates an intermediate signal comprising direct current (DC) levels representative of the power spectrum of the communication signal at different instants of time; an analog-to-digital converter (ADC) coupled to the receiver for sampling the intermediate signal at a sample rate and generating digital words, each representing a sample of the intermediate signal; a memory connected to the ADC that stores the digital words generated by the ADC; a processor coupled to the ADC and to the memory, wherein the processor:

(i) tunes the receiver to a frequency associated with the communication signal;

(ii) controls the sample rate of the ADC for a period of time that exceeds one frame of the video signal to obtain a data set comprising a plurality of samples of the intermediate signal for storage in the memory;

(iii) examines the samples to identify a predetermined feature of the communication signal; and (iv) measures a characteristic of the predetermined feature of the communication signal.

Furthermore, insofar that the present invention can be implemented through the use of a programmable processor device, the present invention is also directed to a computer-readable memory medium storing instructions which are executable by a processor for carrying a process of measuring a characteristic of a communication signal in the presence of modulation, comprising steps of:

(a) tuning a receiver to a frequency associated with the communication signal;

(b) controlling the receiver to generate an intermediate signal comprising direct current (DC) levels representative of the power spectrum of the communication signal at different instants of time;

(c) sampling the intermediate signal at a sample rate for a period of time that exceeds one frame of the composite video signal to obtain a data set comprising a plurality of digital samples of the intermediate signal;

(d) examining the plurality of digital samples to identify a predetermined feature of the communication signal; and (e) measuring a characteristic of the predetermined feature of the communication signal.

The above description is intended by way of example only and is not intended to limit the present invention in any way except as set forth in the following claims.

What is claimed is:

1. A method for measuring a characteristic of a communication signal modulated with a composite video signal, comprising steps of:

(a) tuning to a frequency associated with the communication signal;

(b) receiving the communication signal and generating an intermediate signal comprising direct current (DC) levels representative of the power spectrum of the communication signal at different instants of time;

(c) sampling the intermediate signal at a sample rate for a period of time that exceeds one frame of the composite video signal to obtain a plurality of samples of the intermediate signal;

(d) examining the plurality of samples to identify a predetermined feature of the communication signal; and (e) measuring a characteristic of the predetermined feature of the communication signal;

wherein the tuning step comprises tuning to a frequency corresponding to a visual carrier frequency of the communication signal;

wherein the examining step comprises identifying a sample that has a maximum value among the plurality of samples which corresponds in time to a vertical synchronization pulse of the composite video signal and represents a power level at the visual carrier frequency of the communication signal; and wherein the measuring step comprises measuring a power level at the visual carrier frequency of the communication signal based on a level of the maximum value sample.

2. The method of claim 1, wherein the examining step comprises identifying a particular sample that corresponds to a particular portion of the video signal to be measured, and the measuring step comprises measuring the power level of the particular portion of the composite video signal based on a level of the particular sample corresponding in time to the particular portion of the composite video signal.

3. The method of claim 1, wherein the tuning step comprises further tuning to second, third, fourth and fifth frequencies corresponding to the CSO frequencies with respect to the visual carrier frequency; wherein the receiving and sampling steps are executed at each of the second, third, fourth and fifth frequencies to generate second, third, fourth, and fifth pluralities of samples, respectively; the examining step comprises identifying second, third, fourth and fifth groups of samples in the second, third, fourth and fifth pluralities of sample values, respectively, which coincide in time with no modulation of the communication signal; the measuring step comprises measuring a power level of the communication signal at each of the second, third, fourth and fifth frequencies; and further comprising step (f) of comparing the power level at the visual carrier frequency with the power levels at the second, third, fourth and fifth frequencies to compute a CSO distortion measurement.

4. An apparatus for measuring a characteristic of a communication signal modulated by a composite video signal, comprising:

(a) a receiver that receives the communication signal and generates an intermediate signal comprising direct current (DC) levels representative of the power spectrum of the communication signal at different instants of time;

(b) an analog-to-digital converter (ADC) coupled to the receiver for sampling the intermediate signal at a sample rate and generating digital words representing samples of the intermediate signal;

(c) a memory connected to the ADC that stores the digital words generated by the ADC;

(d) a processor coupled to the ADC and to the memory, wherein the processor:

(i) tunes the receiver to a frequency associated with the communication signal;

(ii) controls the sample rate of the ADC for a period of time that exceeds one frame of the video signal to obtain a plurality of samples of the intermediate signal for storage in the memory;

(iii) examines the plurality of samples to identify a predetermined feature of the communication signal; and (iv) measures a characteristic of the predetermined feature of the communication signal;

wherein the processor tunes the receiver to a frequency corresponding to a visual carrier frequency of the communication signal, examines the plurality of samples to identify a sample having a maximum value among the plurality of sample values, the maximum value sample corresponding in time to a vertical synchronization pulse of the composite video signal and representing a power level at the visual carrier frequency of the communication signal, and measures a power level at the visual carrier frequency of the communication signal based on the level of the maximum value sample.

5. The apparatus of claim 4, wherein the processor identifies a particular sample of the plurality of samples that corresponds to the particular portion of the video signal to be measured, and measures the power level of the particular portion of the composite video signal based on a level of the particular sample.

6. The apparatus of claim 4, and wherein the processor tunes to second, third, fourth and fifth frequencies corresponding to the CSO frequencies with respect to the visual carrier frequency; at each of the second, third, fourth and fifth frequencies generates second, third, fourth, and fifth pluralities of samples, respectively; identifies second, third, fourth and fifth groups of samples in the second, third, fourth and fifth pluralities of samples, respectively, which coincide in time with no modulation of the communication signal; measures a power level of the communication signal at each of the second, third, fourth and fifth frequencies; and compares the power level at the visual carrier frequency with the power levels at the second, third, fourth and fifth frequencies to compute a CSO distortion measurement.

7. A computer-readable memory medium storing instructions which are executable by a processor for performing a process of measuring a characteristic of a communication signal in the presence of modulation, comprising steps of:

(a) tuning a receiver to a frequency to receive the communication signal;

(b) controlling the receiver to generate an intermediate signal comprising direct current (DC) levels representative of the power spectrum of the communication signal at different instants of time;

(c) sampling the intermediate signal at a sample rate for a period of time that exceeds one frame of the composite video signal to obtain a plurality of digital samples of the intermediate signal;

(d) examining the plurality of digital samples to identify a predetermined feature of the communication signal; and (e) measuring a characteristic of the predetermined feature of the communication signal;

wherein the instructions stored on the memory medium for tuning comprise instructions for tuning to a visual carrier frequency of the communication signal;

wherein the instructions for examining comprise instructions for identifying a sample that has a maximum value among the plurality of digital samples, the maximum value sample corresponding in time to a vertical synchronization pulse of the composite video signal and representing a power level at the visual carrier frequency of the communication signal; and wherein the instructions for measuring comprise instructions for measuring a power level at the visual carrier frequency of the communication signal based on the level of the maximum value sample.

8. The computer-readable memory medium of claim 7, wherein the instructions stored on the memory medium for examining comprise instructions for identifying a particular sample of the plurality of digital samples that corresponds to a particular portion of the video signal to be measured, and the instructions for measuring comprise instructions for measuring the power level of the particular portion of the composite video signal based on a level of the particular sample.

9. The computer-readable memory medium of claim 7, wherein the instructions stored on the memory medium for tuning comprise instructions for further tuning to second, third, fourth and fifth frequencies corresponding to the CSO frequencies with respect to the visual carrier frequency; the instructions for the controlling and sampling steps comprise instructions to generate second, third, fourth, and fifth pluralities of digital samples, at the second, third, fourth and fifth frequencies, respectively; the instructions for examining comprise instructions for identifying second, third, fourth and fifth samples corresponding to groups of samples in the second, third, fourth and fifth pluralities of digital samples, respectively, which coincide in time with no modulation of the communication signal; the instructions comprise instructions for measuring a power level of the communication signal at each of the second, third, fourth and fifth frequencies, and further comprising instructions for comparing the power level at the first frequency with the power levels of the second, third, fourth and fifth frequencies to compute a CSO distortion measurement.

* * * * *